UNITED STATES PATENT OFFICE.

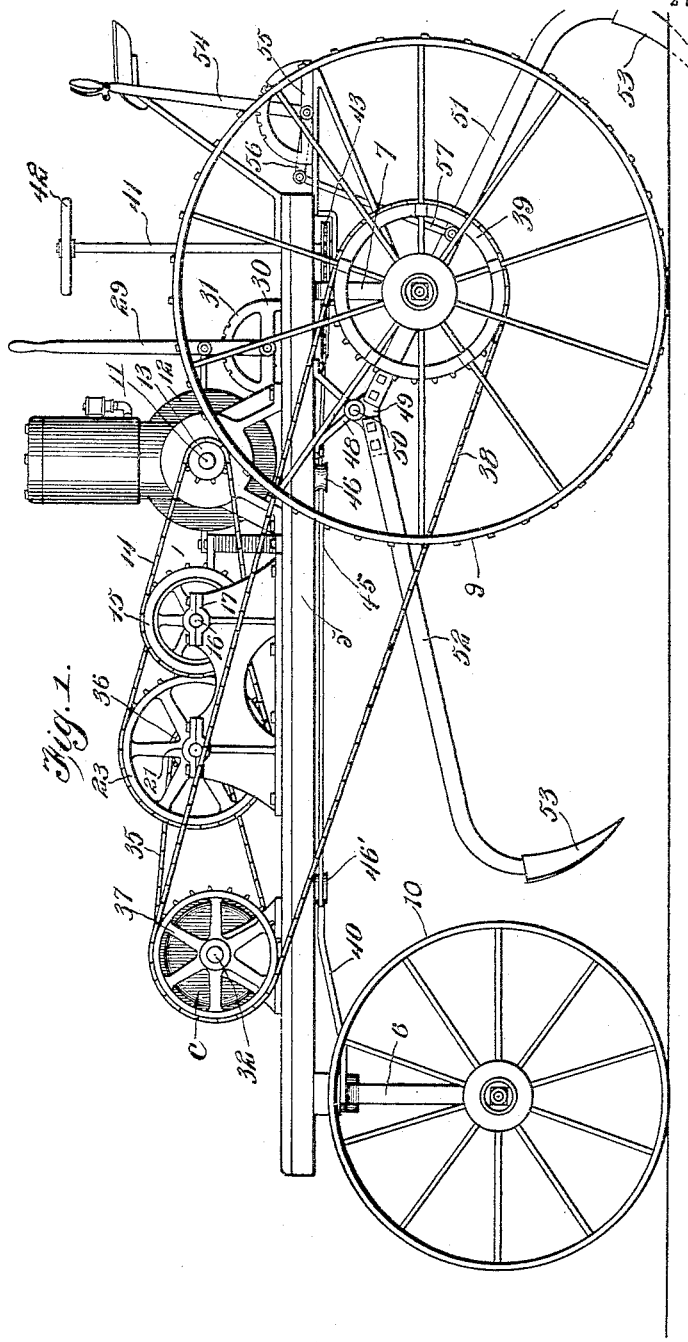

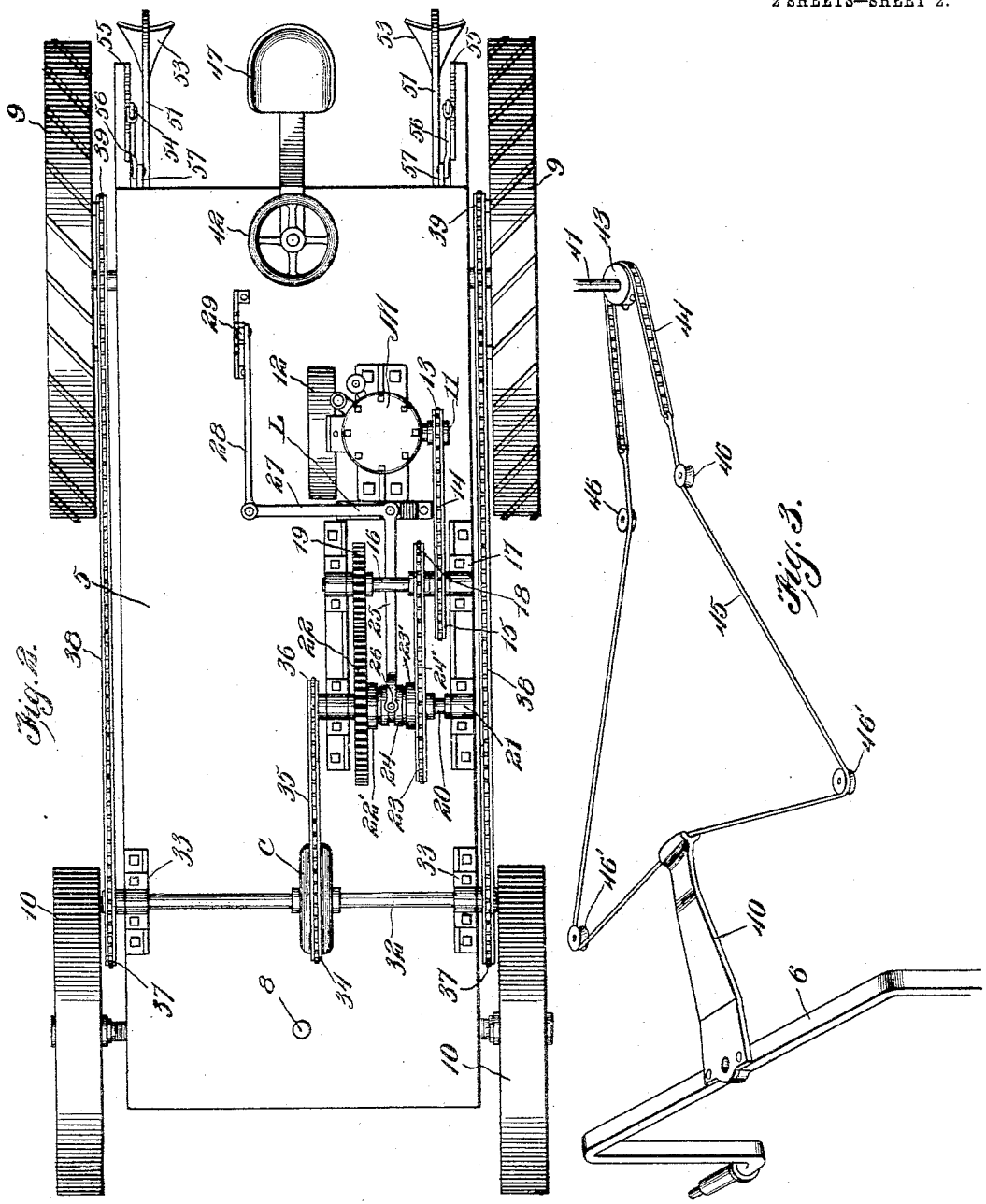

DELON H. ABBOTT, OF VANDEMERE, NORTH CAROLINA.

CULTIVATING-MACHINE.

962,288.   Specification of Letters Patent.   Patented June 21, 1910.

Application filed August 19, 1909. Serial No. 513,581.

*To all whom it may concern:*

Be it known that I, DELON H. ABBOTT, a citizen of the United States, residing at Vandemere, in the county of Pamlico and State of North Carolina, have invented new and useful Improvements in Cultivating-Machines, of which the following is a specification.

This invention relates to agricultural implements and more particularly to machines for cultivating the soil by stirring and agitating the soil adjacent to rows of growing plants straddled by the machine by the process generally known as "cultivating".

One object of the present invention is to construct a cultivating machine which shall be supported upon and which may be successfully operated by a tractor of simple and improved construction.

A further object is to provide a cultivating machine of the character described which will not require to be turned at the end of each row, but which may be operatively propelled in two directions.

A still further object of the invention is to equip a machine of the character described with forwardly and rearwardly extending implement carrying beams which shall be supported upon an oscillatory member in such a manner that when one beam or set of beams is depressed to an engaging position, the oppositely extending beam or set of beams shall be raised to an inoperative position.

Still further objects of the invention are to simplify and improve the general construction and operation of a machine of the character described.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention; it being however understood that no limitation is necessarily made to the precise structural details therein exhibited, but that changes, alterations and modifications within the scope of the invention may be resorted to when desired.

In the drawing, Figure 1 is a side elevation of a cultivating machine constructed in accordance with the invention. Fig. 2 is a top plan view of the same. Fig. 3 is a perspective detail view illustrating the steering gear.

Corresponding parts in the several figures are denoted by like characters of reference.

The bed or platform 5 of the improved machine is mounted upon arched front and rear axles designated respectively by 6 and 7; the front axle 6 being pivotally mounted for steering purposes as upon a king-bolt 8. Tractor wheels 9 are mounted for rotation upon the spindles of the rear axle, and transporting wheels 10 of ordinary construction are similarly mounted upon the spindles of the front axle.

Supported upon the bed of the machine is a motor M of any suitable approved construction, such as a gasolene or other internal combustion engine; the driven main shaft 11 of said motor carries a fly wheel 12 and a sprocket wheel 13 which is connected by a chain 14 with a sprocket wheel 15 upon a countershaft 16 supported in bearings 17. The shaft 16 carries an additional sprocket wheel 18 and a pinion 19 both of which are fixed upon the shaft for rotation therewith. A second auxiliary or countershaft 20 which is supported in bearings 21 carries a loose gear wheel 22 meshing with the pinion 19 and a loose sprocket wheel 23 which is connected by a chain 24' with the sprocket wheel 18. The hubs 22', 23' of the wheels 22 and 23 are cupped to form members of a friction clutch, the movable member of which 24 is slidably mounted upon the shaft 20 for rotation therewith, intermediate the said hubs, with either of which it may be placed in operative engagement by means of a shipping lever L consisting of a bell crank, one arm of which 25 has a terminal fork 26 engaging an annular groove in the clutch member either directly or by means of pins or anti-friction members of usual well-known construction; the other arm 27 of the shipping lever or bell crank is connected by a link 28 with a hand lever 29 fulcrumed upon a lever stand 30 including a segment rack 31 adapted to be engaged in the usual manner by a stop member upon the lever which thus, together with the parts controlled thereby, may be secured at various adjustments. It is obvious that by this mechanism the clutch member 24 may be shifted to engage the hub of either the gear wheel 22 or the sprocket wheel 23, thereby reversing the direction of rotation of the shaft 20; it is likewise obvious that when the clutch member occupies a position intermediate the hubs of said wheels, the shaft 20 will remain stationary, and the shaft 16 will rotate idly with reference to the sprocket wheel 18 and the pinion 19.

A shaft 32 supported in bearings 33 adjacent to the sides of the bed or platform carries a compensating gearing, the casing C of which only is shown, since the detailed construction of said compensating gear is not a part of the present invention; the casing C however is peripherally toothed as shown at 34 to constitute a sprocket wheel which is connected by a chain 35 with a sprocket pinion 36 upon the shaft 20. The shaft 32 is terminally provided with sprocket wheels 37 connected by chains 38 with sprocket wheels 39 that are suitably connected with the tractor wheels 9 to which motion may thus be transmitted from the source of power, it being readily understood that turning and other evolutions of the machine are permitted by the presence of a compensating gear.

The front axle 6 is provided with a rearwardly extending arm 40 constituting a crank whereby the axle may be rotated about the axis of the king-bolt.

A vertical shaft 41 supported in suitable bearings near the rear end of the bed or platform of the machine carries at its upper end a hand wheel 42 and adjacent to its lower end a sprocket pinion 43. A chain 44 engaging said sprocket pinion is terminally connected with the ends of a flexible element 45, such as a rope or cable which is guided over suitably disposed pulleys 46, 46', and which is securely connected intermediate its ends with the arm or crank 40.

It will be seen that by manipulating the shaft 41 by the hand wheel 42 the axle 6 may be rotated about the king-bolt for the purpose of steering the machine.

A seat 47 for the driver or operator is disposed in suitable proximity to the steering wheel and to the reversing lever 29.

Secured upon the under side of the bed of the machine adjacent to each side is a bracket 48 serving to support an oscillatory member 49 which is mounted for rotation upon a pin or shaft 50, the latter being disposed transversely of the bed or platform and approximately parallel to the rear axle and in a plane considerably above the plane of the wheel carrying spindles of said axle. Implement carrying beams 51 and 52 extending respectively in a rearward and in a forward direction, are securely connected with the oscillatory member 49, said beams having terminal standards and earth engaging implements, such as cultivator blades or shovels 53 which are faced in opposite directions, and secured upon the standards of the beams in such relative position that when the implement connected with one beam is depressed to an earth engaging position, as shown in Fig. 1, the implement carried by the oppositely extending beam will be elevated to an inoperative position, as will be best seen by reference to Fig. 1 of the drawings, while at an intermediate position, the implements of both beams will be carried at a sufficient distance above the ground to avoid engaging the latter, thus facilitating transportation from one place to another. Adjustment of the implement carrying beams may be effected by means of hand levers 54 pivoted upon rack segments 55 and having arms 56 that are connected by means of links 57 with the rearward extending beams 51; said hand levers being provided with the customary stop members to engage the segment racks for the purpose of securing the parts in adjusted position. Under the construction illustrated in the drawings each pair or set of implement carrying beams 51, 52 may be independently adjusted, but the several sets of beams may be connected for simultaneous adjustment as will be readily understood. It is also evident that any desired number of sets of implement carrying beams may be carried by the machine by simply changing the dimensions of the latter.

From the foregoing description taken in connection with the drawings herein annexed the operation and advantages of this invention will be readily understood by those skilled in the art to which it appertains.

Assuming that a row of plants is to be operated upon, said row of plants is straddled by the arched axles of the machine which is then propelled, one set of cultivating implements having been previously depressed to an earth engaging position, thus stirring and agitating the soil and throwing the loose soil in the direction of the plants in the usual manner, the operation being easily and efficiently performed owing to the disposition of the axis of the oscillatory element carrying the cultivator beams in a plane above the wheel carrying spindles. When the other end of the row is reached the machine is manipulated, without turning it, to aline it with the next row after which the implements which were temporarily placed in an inoperative position, are readjusted to place those which were previously inoperative in an earth engaging position, after which the machine is propelled in a reverse direction, thus avoiding turning of the machine and enabling the same to be manipulated in much less space than would be otherwise required.

It will be understood that the implement carrying beams may be adjustably connected with the oscillatory member 49, and that other changes of a merely mechanical nature may be made without departing from the spirit of the invention. Thus for instance, the steering arm 40 might be omitted and instead of the flexible member 45 two such members would then be employed, the same being terminally connected at their rear ends direct to the axle 6, adjacent to the ends of the latter, and adjacent to their front ends with the chain 44; by such an arrangement the guide pulleys 46' might be dispensed with; but inasmuch as such a construction would lie within the province of the skilled mechanic, it has not been deemed necessary to particularly illustrate the same.

I am aware that plows for side hill and other work have been heretofore constructed in which a pair of plows faced in opposite directions have been supported by a motor driven platform. I am not aware however, that a straddle row cultivating machine has heretofore been constructed, the same being equipped with arched axles having carrying wheels and supporting a motor driven platform upon which oppositely extending cultivator beams having oppositely faced blades or shovels, are supported together with means for adjusting the same for work. I am likewise not aware that a machine of this class has been constructed in which the oppositely extending beams are connected with a member supported for oscillation in a plane above the spindles of the carrying wheels.

By these and other features of construction a machine is produced which is exceptionally effective and useful for the purpose of cultivating growing crops without necessity for turning the machine around at the end of each row as will be readily understood from the foregoing description.

Having thus described the invention, what is claimed, is:—

In a machine of the class described, a platform, arched axles supporting the same and having wheel carrying spindles, propulsion means including a motor and reversing gear, oscillatory members supported adjacent to the platform in a plane above the wheel carrying spindles, implement carrying beams connected with the oscillatory members and extending forwardly and rearwardly therefrom, cultivating implements connected with the beams and faced in opposite directions, and means connected with the rearwardly extending beams to vertically adjust the same thereby rocking the oscillatory members and effecting vertical adjustment in an opposite direction of the forwardly extending beams.

In testimony whereof I affix my signature in presence of two witnesses.

DELON H. ABBOTT.

Witnesses:
  WM. BAGGER,
  JOHN L. FLETCHER.